Nov. 26, 1957  J. E. SNOW  2,814,365
FRICTION ENERGY ABSORBER
Filed Sept. 6, 1955  3 Sheets-Sheet 1
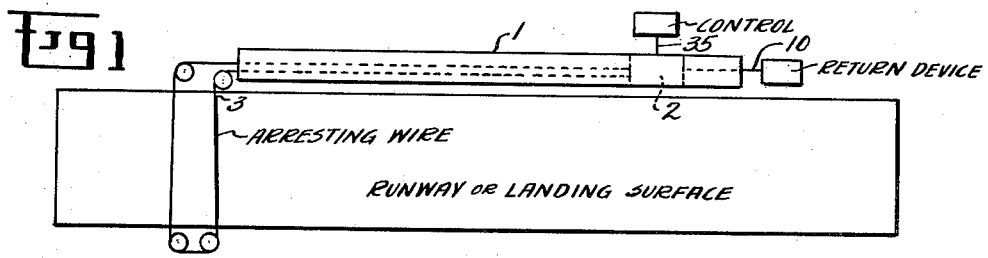
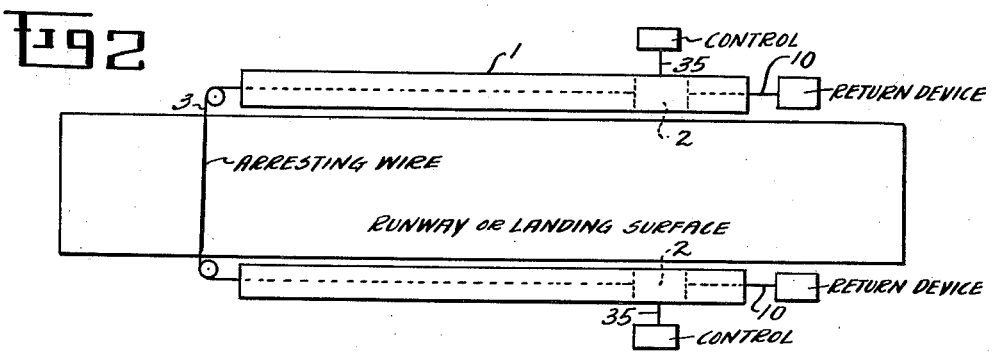
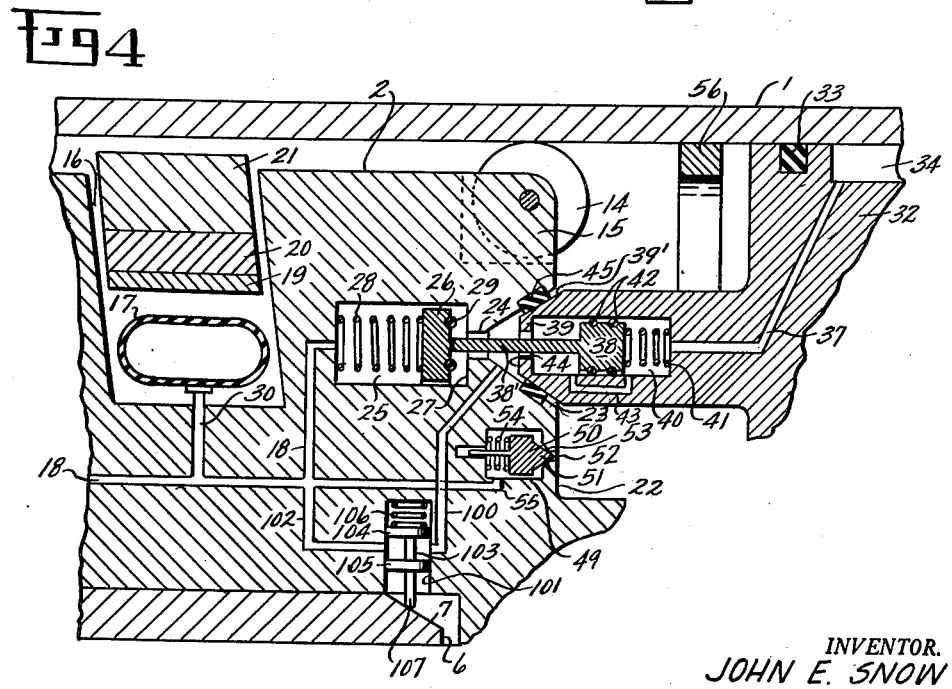
INVENTOR.
JOHN E. SNOW
BY
*John B. Brady*
HIS ATTORNEY—

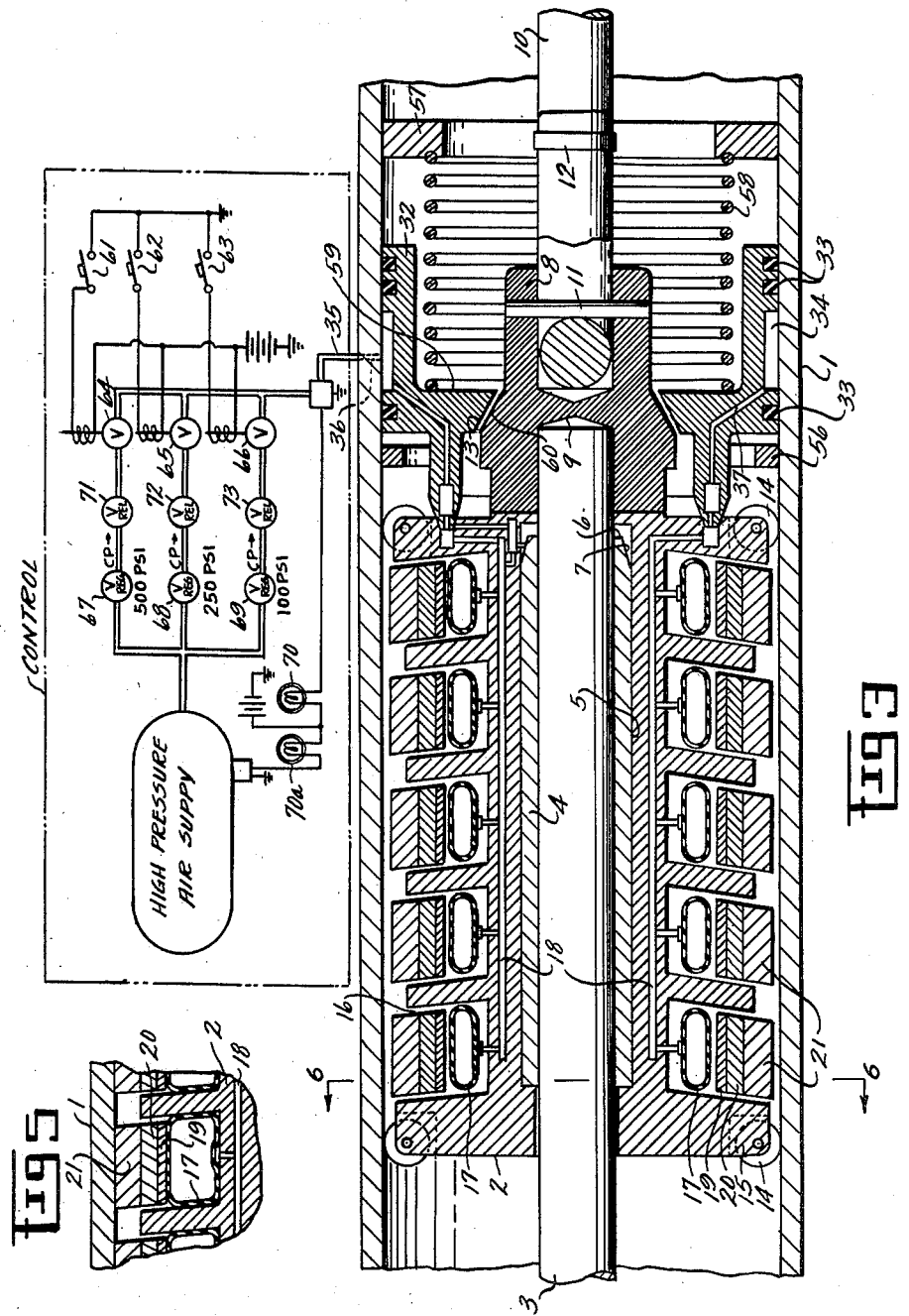

United States Patent Office 2,814,365
Patented Nov. 26, 1957

2,814,365

FRICTION ENERGY ABSORBER

John E. Snow, Fairborn, Ohio

Application September 6, 1955, Serial No. 532,718

4 Claims. (Cl. 188—151)

My invention relates to that class of devices known as energy absorbers and more particularly to energy absorbers employing friction brakes.

While I direct my invention to the problem of arresting the forward motion of an aircraft, it will be readily apparent that my invention has many other uses.

The problem of arresting the forward motion of an aircraft has two distinct facets. One is to provide some means to engage a drag to the aircraft contacted and the other facet is to provide some means of applying a steady drag against the forward motion of the aircraft once it is engaged. Up to the time of my present invention I am aware of the well known liquid drag tubes, pneumatic drag tubes, anchor chains, sand bags and the like being attached to the arresting barrier which contacts the forwardly moving aircraft. While the aforementioned drag means have performed somewhat satisfactorily, I have found that a relatively simple friction device would be more economical and would require less maintenance.

It is the principal object of my invention to provide a means to maintain constant pressure on a friction brake during operation.

It is a further object of my invention to provide a means to release excess pressure on a friction brake during operation.

It is a further object of my invention to provide a means to electrically control the pressure of a friction brake.

It is a still further object of my invention to provide a friction energy absorber which includes a piston carrying a plurality of brake shoes operating inside a cylindrical tube whereby the brake shoes are pressed against the inside of the tube by pressure exerted by air bladders filled prior to operation and where said shoes are maintained at a predetermined pressure against the inside of the cylinder and the piston is provided with means to bleed off excess pressure in the air bladders during operation should the operating conditions so require.

My means of accomplishing the foregoing objects may be more readily apprehended by having reference to the accompanying drawings in which:

Figure 1 is a schematic view of a runway showing one form of my invention attached to an arresting cable;

Figure 2 is a schematic view of a runway showing another form of my invention attached to an arresting cable;

Figure 3 is a schematic side elevation view partly in section showing my invention;

Figure 4 is a detail view of certain control valves;

Figure 5 is a detail view of one friction member; and

Similar numerals refer to similar parts throughout the entire specification.

Figure 6:
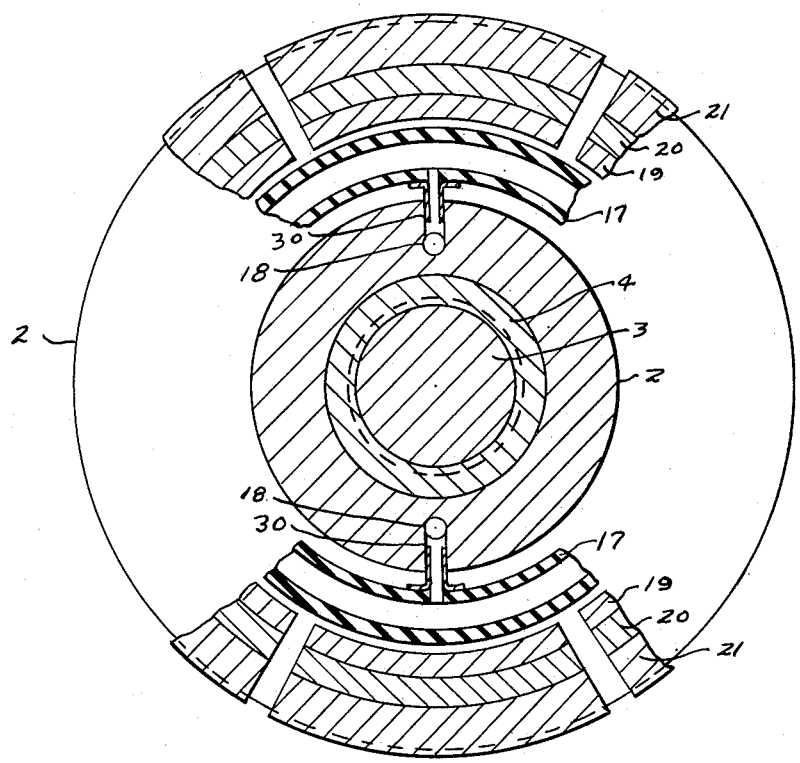
Fig. 6 is a transverse sectional view taken on line 6—6 of Fig. 3.

In Figure 1 I have shown schematically, my invention attached to cables adapted to be engaged by a hook or other means of engaging arresting wires suspended above a runway.

In Figure 2 I have shown schematically, my invention attached to an arresting barrier.

As shown in the drawings, I provide an outer tube 1 in which I place a cylindrical piston 2, which is attached to a cable 3 by means of a tapered sleeve 4 which is swaged around the cable 3 and which is slidably held in a recess 5. One end 6 of the sleeve 4 is beveled to provide a conical surface 7. A cap 8 is swaged on the end 9 of the cable 3 and may be attached to a return cable 10 by any desired means. In practice I prefer to employ a simple mooring pin 11 around which I wrap the cable 10 and hold the bight thus formed by clamps 12. The cap 8 is provided with an annular beveled shoulder 60 as shown. I provide a plurality of small wheels 14 mounted on shoulders 15 to permit the piston 2 to readily reciprocate inside the tube 1.

I have found in practice that the piston 2 will have a tendency to turn during its travel through the tube 1. I may counteract this by providing a bead on the inside of the tube 1 with a cooperating groove in the piston 2 or reverse the arrangement by providing a bead or ridge on the piston 2 and a cooperating longitudinal groove in the inner surface of the tube 1. However, lubrication problems may be encountered in this arrangement as well as the possibility of binding and friction abrasive action. Also special air bladders would be required. Therefore, I have set forth in the drawings the arrangement which I prefer. I provide annular recesses 16 on the piston 2 in each of which I place an expander tube 17, connected to a manifold air passage 18, underneath an insulating separator 19, around which I place a brake shoe 20 covered by friction lining 21. It will be apparent that I place the recesses 16 at an angle other than perpendicular. I prefer to make the angle of the recesses 16 away from the vertical approximately equal to the friction coefficient in numerical value. This permits the friction force and normal force (vertical force due to pressure from the expander tubes 17) to form a resultant force which is directed radially outward. For illustrative purposes I have shown this angle as acute to the normal path of travel of the piston 2 during the arresting operation, although the angle could be perpendicular. It could also be reversed but it is doubtful that as satisfactory results would be achieved. I have found this angular placement reduces the tendency for the brake assembly 17, 19, 20 and 21 to rotate or tip within the recess 16 to cause binding at the edges.

Because of the tendency of the piston 2 to turn during travel in the tube 1, I provide that the piston 2 carries a special arrangement to permit the inflation of the expander tubes 17 when the piston 2 is in a fully retracted position regardless of whether it has turned within the tube 2. As shown in Figure 4, the rear edge 22 of the piston 2 carries an annular groove 23. The groove 23 opens into an annular passage 24 which communicates with an annular recess 25. I provide that a piston 26 is held against the forward wall 27 of the recess 25 by means of a spring 28. An O ring 29 on the piston 26 provides a fluid tight seal for the piston 26 when it presses against the wall 27. A plurality of passages 30 connect the expander tubes 17 with the manifold passage 18 which runs from the annular recess 25 as shown.

I provide a floating probe 32 which is held fluid tight against the inside of the tube 1 by means of O rings 33. An annular passage 34 permits air from an external source 35 to pass through a passage 36 to a drilled passage 37. A piston 38 adapted to reciprocate in an annular recess 40 carries a forward stem 38' and the piston 38 is held against a shoulder 39 by a spring 41. I provide a pair of O rings 42 on the piston 38 to maintain the piston 38 fluid tight against the annular recess 40 as shown. A bypass 43 connects the rear of the annular recess 40 with the forward portion thereof and is normally closed by the piston 38 when it abuts the shoulder 39. The forward stem 38' extends from the outer side of the piston 38 and is guided by the edge 44 of the inwardly turned shoulder 39.

The outside shoulder 39' of 39 is tapered to fit the groove 23. I provide a sealant strip 45 on the side of the groove 23 for fluid tight connection when the outside shoulder 39' mates with the groove 23. It will be apparent that I have provided a quick disconnect means to pass air from the outside of the tube 1 through the passage 36 in the floating probe 32, through the passage 37 and into the expander tubes 17 by means of the passages 30 and the manifold 18 which receive air from the drilled passage 37 when the stem 38' pushes the piston 26 rearwardly and in turn uncovers the by-pass 43 when it is pushed inwardly when the stem 38' centers into the grove 23. The springs 41 and 28 are calibrated to permit this operation.

It is thus clear that the friction lining 21 will press against the inner side of the tube 1 with the force exerted by the expander tubes 17 inflated with air forced from the outside source 35.

As soon as an aircraft crashes the barrier, the cable 3 is engaged and commences to pull the piston 2 through the tube 1, absorbing thereby the forward energy of the aircraft.

At the end of the energy absorbing operation, it will be desired to release the air pressure in the expander tubes 17 so that the wheels 14 will carry the piston 2. I provide that when the expander tubes 17 are inflated, the friction lining 21 presses against the inner side of the tube 1 and the wheels 14 are not in contact until the air is released from the expander tubes 17.

It may also be necessary to release some of the air in the expander tubes 17 during the arresting operation if the brakes decelerate the aircraft so rapidly as to endanger external parts of the aircraft or crew.

For this purpose, I provide a decelerating sensing piston 50 reciprocating in a cylindrical recess 49. The piston 50 has a sharply tapered end 51 which normally closes the port 52 by pressing against a tapered shoulder 53. A spring 54 presses the piston 50 against the port 52 with sufficient force to close it. A passage 55 leads from the recess 49 to the manifold 18 as shown. The piston 50 is of sufficient mass that when the piston 2 decelerates excessively the piston 50 slides forwardly uncovering the port 52 thereby permitting air to escape. As soon as the piston 2 ceases to decelerate, the piston 50 closes the port 52 again.

When the piston 2 comes to rest, it is desirable to empty the system of air pressure. For this purpose, I provide a by-pass system to permit the release of any air pressure in excess of atmospheric pressure by a passage 100 leading from the groove 23 to a cylindrical recess 101 which has a passage 102 communicating with the manifold 18. In the recess 101, I mount a piston 103 having twin plates 104 and 105. A spring 106 is mounted behind the plate 104 and adapted to press against the plate 104 to normally close the passage of air between the passage 100 and 102 through the recess 101 as shown. A plunger 107 attached to the lower plate 105 and is adapted to engage the beveled shoulder 7 on the sleeve 4 and to be moved radially thereby. When the piston 2 is at rest, and it is desired to retract the piston 2, the return cable 10 is pulled to bring the sleeve 4 around the cable 3 rearwardly so that the plunger 107 is engaged by the shoulder 7 and the seal of the passages 100 and 102 is uncovered, permitting the escape of air held in excess of atmospheric pressure and thus deflating the tubes 17 which then permits the wheels 14 to operate and to bear the weight of the piston 2. This permits the piston 2 to be readily retracted by the cable 10 when it is operated.

Upon return of the piston 2 the problem of alignment between the floating probe 32 and the groove 23 is solved by providing the floating probe 32 with space to move longitudinally. Changes in the length of the arresting cable 3 due to thermal expansion precludes the use of a fixed position for the forward stem 38'. I provide that a forward stop 56 and a rear stop 57 limit the travel of the floating probe 32. A spring 58 abuts the rear stop 57 and presses against the shoulder 59 of the probe 32. This spring 58 is of sufficient strength to hold the forward stem 38' firmly against the sealant 45 when the piston 2 is fully retracted. When the piston 2 is fully retracted, the shoulder 60 of the cap 8 mates with the shoulder 13 of the floating probe 32 and thus centers the alignment of the groove 23 and the forward stem 38'.

I provide electrical controls for the inflation of the expander tubes 17. Obviously, it is necessary to provide for varying pressures against the inside of the tube 1 to absorb the forward energy of varying weights of aircraft. Consequently, I provide a plurality of switches 61, 62 and 63. I provide that an operator operating any one of these switches, will open a corresponding solenoid valve 64, 65 and 66 and permit air to flow through a respective regulator valve 67, 68 and 69. The air will flow from the regulator valve selected to a common flow line 35 and thence to the expander tubes 17 as set forth above. In this condition, the piston 2 is ready for use as an energy absorbing drag. In the event a leak occurs in the air system, I provide that a warning light 70 will flash upon the lessening of the pressure in the line 35. In the event the pressure in the air supply source drops below an accepted minimum, I provide that another warning light 70a flashes. While I have shown one such arrangement, duplicate lights 70 and duplicate pressure sensitive switches are required for each pressure setting. Thus, for the three settings shown in my drawings, it is necessary to add two additional lights 70 and two additional switches.

I also provide that while the piston 2 is fully retracted, if the air system is charged with a pressure in excess of that required, an operator may instantly decrease the air pressure against the inner side of the tube 1 by providing relief valves such as 71, 72 and 73, which are responsive to a predetermined pressure in varying amounts. For illustrative purposes, I provide that relief valve 73 will open at 100 p. s. i. If it is desired to reduce the air pressure in the system to 100 p. s. i. from a greater pressure, the operator closes switch 63 which calls for air to be pumped through valve 66 into the common flow tube 35 and thence to the air system. However, since there is greater than 100 p. s. i. already in the system, valve 69 does not operate but the opening of the valve 66 subjects the relief valve 73 to greater pressure than 100 p. s. i. and it opens and vents the system down to 100 p. s. i.

Having described my invention, what I regard as new and desire to protect by Letters Patent is:

1. In a friction energy absorber, a tube, a piston in said tube adapted to reciprocate therein, means to pull said piston forwardly and rearwardly in said tube, friction means carried by said piston and adapted to press against the inner side of said tube when said piston reciprocates in said tube, means in said piston to releasably force said friction means against said inner side of said tube, means external of said piston to actuate said last named means at a predetermined selective pressure, means to hold said friction means at said predetermined selective pressure during movement of said piston in said tube, and means responsive to deceleration during movement of said piston in said tube in one direction only to reduce said pressure of said friction means.

2. In a friction energy absorber, a tube, a piston in said tube adapted to reciprocate therein, means to move said piston forwardly in said tube, means to move said piston rearwardly in said tube, means in said tube to limit the rearward movement of said piston in said tube, friction means mounted on said piston intermediate said piston and the inner side of said tube, means in said piston to transmt force to move said friction means into friction contact with said inner side of said tube, means in said tube external of said piston to cooperate with said last named means when said piston is in a fully rearward position to connect said last named means to an external source of said force, means in said piston to maintain said force against said friction means during forward movement of said piston, means responsive to deceleration of said piston during its forward movement to lessen said force in said piston whereby the pressure of said friction means against said tube is somewhat reduced, and means in said piston to release all of said force against said friction means, said means operable upon the means to return said piston after its forward movement in said tube being actuated.

3. In a friction energy absorber, a tube, a piston mounted in said tube adapted to reciprocate therein, a cable, said cable slidably mounted in said piston adjacent the rear end of said cable and adapted to pull said piston forwardly through said tube, a second cable attached to the rear end of said first cable adapted to return said piston, means in said tube to releasably connect with cooperating means in said piston to pass air under pressure external of said tube into said piston, friction means mounted on said piston intermediate said piston and said tube, said friction means adapted to be pressed against said tube, means in said piston responsive to said air pressure to press said friction means against said tube, means external of said portion to selectively control said air pressure, means in said piston to seal said air passages when said piston moves forwardly through said tube thereby exerting said selected air pressure on said friction means during said forward movement, means in said piston responsive to deceleration of said piston traveling forwardly through said tube to decrease the pressure of said friction members against said tube, and means in said piston cooperating with means on said first cable to release said air pressure when said second cable pulls said piston in a rearwardly direction.

4. In a friction energy absorber, a tube, a piston in said tube adapted to reciprocate therein, annular recesses in said piston, said recesses adapted to accommodate friction shoes mounted therein, means to pass air under selected pressure from a source external of said piston through said piston to said recesses, compressible means in said recesses intermediate said friction shoes and said air passages, said compressible means responsive to said air pressure and adapted to press against the inner side of said friction shoes to retard the movement of said piston in said tube by forcing said friction shoes against the inner side of said tube, means in said piston to seal said air pressure in said piston under said selected pressure, means connected to said piston to pull said piston forwardly through said tube, means to pull said piston rearwardly through said tube, means responsive to said rearward pull to release said fluid pressure and means in said piston responsive to deceleration of said piston to reduce the pressure of said friction shoes against said tube.

References Cited in the file of this patent
UNITED STATES PATENTS
875,759     Whitcomb _____ Jan. 7, 1908